Patented Feb. 3, 1925.

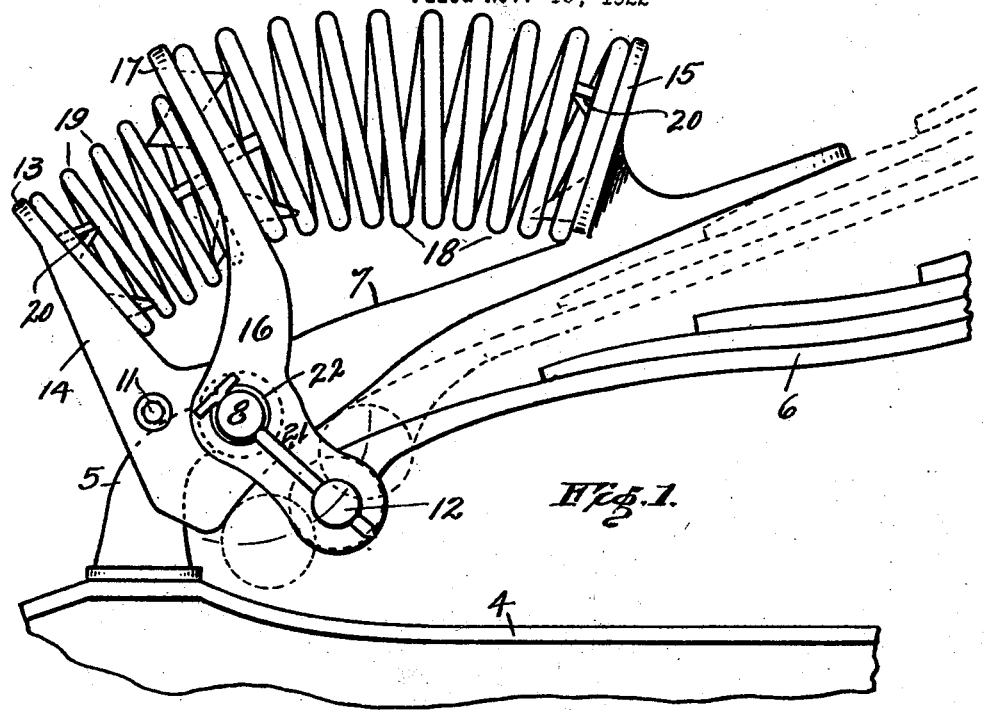
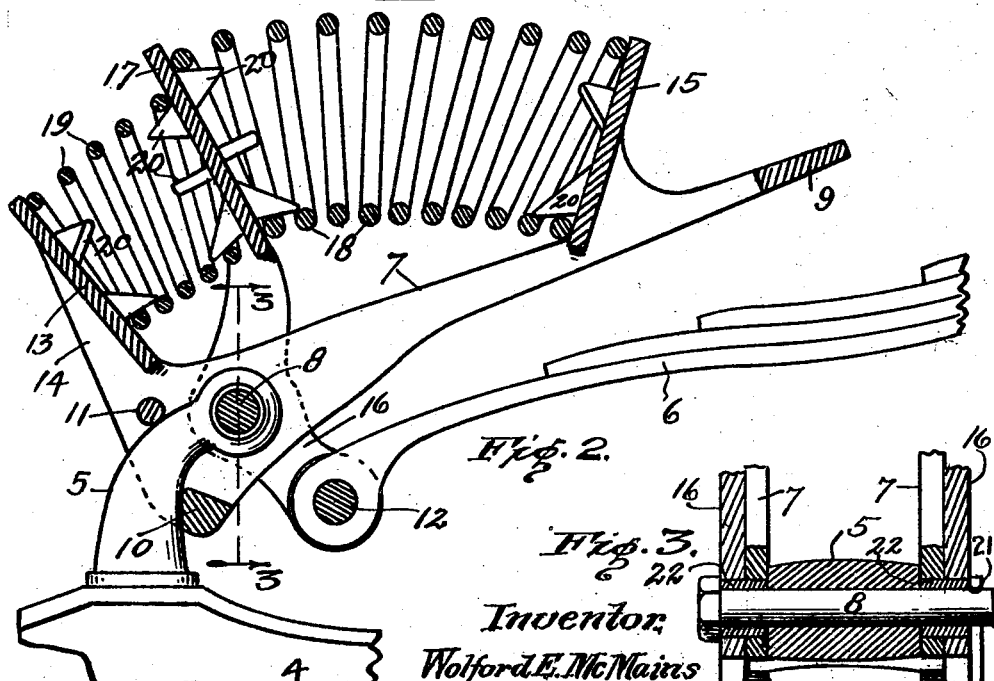
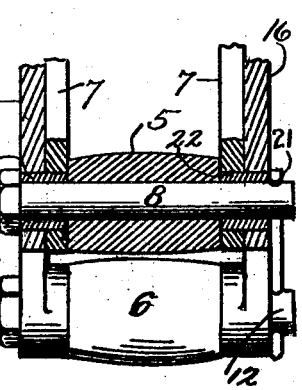

1,524,743

UNITED STATES PATENT OFFICE.

WOLFORD E. McMAINS, OF INDIANAPOLIS, INDIANA.

VEHICLE SHOCK ABSORBER.

Application filed November 16, 1922. Serial No. 601,404.

*To all whom it may concern:*

Be it known that I, WOLFORD E. MC-MAINS, a citizen of the United States, residing at Indianapolis, in the county of Marion and State of Indiana, have invented new and useful Improvements in Vehicle Shock Absorbers, of which the following is a specification.

The object of this invention is to provide a shock absorber for automobiles that can be attached to the ends of the body springs in general use and to the adjacent perch-hangers without any other change, so the springs will be suspended as usual relative to the perches.

Another object is to practically eliminate the rebound action as well as that caused by impact, first by the resistance of an auxiliary spring and then by restraining the rebound of the body spring.

Another object is to provide means for the factory assembly of the perch extension member and shackle, with the auxiliary springs operatively positioned under tension ready for use so that installation on a car may be easily and quickly accomplished by unskilled persons.

I accomplish the above and other objects which will hereinafter appear, by the mechanism illustrated in the accompanying drawings, in which—

Fig. 1 is a view in side elevation of a portion of the front axle and body-springs of an automobile of a common type showing my invention applied thereto. Fig. 2 is a vertical longitudinal section of the same, and Fig. 3 is a detail in cross section on the line 3—3 of Fig. 2.

In the drawings in which like characters of reference indicate like parts in the several views, 4 indicates an axle, 5 a perch-hanger, and 6 a body-spring, all of usual and well known construction. While said members for the front of a car are here shown, it will be understood that the invention presently to be described is equally applicable to said parts at the rear with such changes in proportions as the differences between the front and rear mechanism of the car may require.

The body-member of my invention comprises a pair of parallel bars 7, 7, which receive the perch-hanger 5 between them and to which they are attached by the perch-bolt 8. The bars are connected together at their upper ends by a cross member 9 and below the perch-eye by a cross bar 10 which later contacts the stem of the perch, as shown in Fig. 2, thereby preventing downward swinging movement of the bars around the bolt 8. Movement of the bars in the opposite direction is prevented by a bolt 11 that connects the two levers on the opposite side of the perch-hanger from the cross bar 10. The result is that the body-member comprising the bars 7, 7, is held immovable relative to the perch and said body-member is in effect an upward elongation of the perch-hanger of such extent as to reach well up on the body-spring 6 where its cross bar 10 acts there as a stop to arrest the upward movement of body-spring 6 on the rebound, as shown by dotted lines of said spring in Fig. 1.

A spring-bearing plate 13 is supported above the bars 7, 7, in angular relation to said bars, by integral standards 14 located at the lower end of said bars, and a plate 15 for a like purpose is located above said bars and at a considerable distance from the plate 13 and also from the upper ends of said bars as shown.

Pivoted on the perch-bolt 8, is a shackle 16, to the depending arms of which the body-spring 6 is pivoted by a bolt 12. The upper end of the shackle supports a plate 17, between one side of which and the plate 15 a spring 18 is seated, and between the other side of which and the plate 13 a spring 19 is seated. Spring retaining lugs 20 are formed on the spring-contacting faces of each of said plates.

A pin 21 passes through holes in the ends of both of the bolts 8 and 12, as shown in Fig. 1, and to cause the pin to drive evenly its upper end is split and the two resulting members are bent oppositely at right angles to form a head.

The shackle 16 is secured, preferably at the factory, to the body-member by bushings 22 just long enough to extend through a bar 7 and its adjacent shackle member. The springs 18 and 19 are preferably assembled at the factory as stated for the bushings, in condition for easy installation on a car, requiring only that a bolt connecting the spring-body and perch-hanger be removed, my device positioned on the perch-hanger, and the bolts placed through the bushings, and the lower ends of the shackle bolted to the body-spring.

In the operation of my invention, direct impact is absorbed by the spring 18. The rebound is first relieved by the spring 19 and if the rebound is great enough the upward movement of the body-spring is checked by its contact with cross member 9 connecting the upper ends of the bars 7, 7.

While I have here shown and described the preferred form of my invention, it is capable of many modifications, some of which I have above referred to, and I therefore do not desire to be held strictly to the form shown, or any more than is required by the appended claims.

I claim—

1. A shock absorber including an axle a body-spring, a perch-hanger, supported upon the axle, a body-member forming a perch-extension rigidly secured to the perch-hanger, said body-member having a pair of spaced-apart spring-bearing plates, a shackle pivoted to the perch-bolt and supporting the body-spring below the perch-extension, said shackle having an upward extension supporting a spring-bearing plate between the spread-apart plates of the perch-extension, and a pair of springs one on each side of said shackle-plate bearing against it and a respective one of said spaced-apart plates on the same side of the shackle-plate.

2. A shock absorber including a body-spring, a perch-hanger, a pair of bars receiving the perch-hanger between them and through which the perch-bolt passes, means to keep the bars from a swinging movement about the perch-bolt, means supported by the bars to arrest the upward movement of the body-spring, a pair of spaced-apart spring-bearing plates on the bars, a shackle pivoted on the perch-bolt having an upwardly extended spring-bearing plate between the pair of plates on the two bars, the other end of the shackle being pivoted to the end of the body-spring, and a pair of auxiliary springs seated against the shackle-plate and the respective plates of the two bars.

3. A shock absorber including a body-spring, a perch-hanger, a pair of spaced-apart bars receiving the perch-hanger between them and pivoted on the perch-bolt, said bars connected by a cross-member contacting one side of the perch-stem, a removable member carried by the bars contacting the other side of the perch-stem thereby rigidly connecting the bars with the perch-hanger, said bars having a connecting member at their ends remote from the perch-hanger and having a pair of spaced-apart spring-bearing plates, a shackle pivoted on the perch-bolt and having a spring-bearing plate on one side of the bolt between the two plates of the pair of bars, a pair of springs one on each side of the shackle spring-bearing plate contacting the latter and the respective plates of the pair of bars, the body-spring being pivoted to the shackle on the opposite side of the perch-pivot from the pair of springs.

4. A shock absorber including a perch-hanger, a perch-hanger bolt, a plurality of pairs of separate members secured to the perch-hanger by said bolt, and bushing sleeves surrounding the bolt holes in each pair and joining the members of each pair together without the aid of the bolt.

5. A shock absorber comprising a perch-hanger, a perch-hanger bolt, a double pair of separately formed members connected by the bolt with the perch-hanger, and bushing sleeves in the bolt holes, normally connecting each pair of members together.

Signed at Indianapolis, Indiana, this the 14th day of November, 1922.

WOLFORD E. McMAINS.